(12) United States Patent
Kuronen et al.

(10) Patent No.: US 11,667,859 B2
(45) Date of Patent: Jun. 6, 2023

(54) RENEWABLE HYDROCARBON COMPOSITION HAVING GOOD CETANE NUMBER AND GOOD COLD PROPERTIES

(71) Applicant: Neste Oyj, Espoo (FI)

(72) Inventors: Markku Kuronen, Porvoo (FI); Ulla Kiiski, Porvoo (FI); Jenni Nortio, Porvoo (FI); Anne Ruonakangas, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 17/770,738

(22) PCT Filed: Dec. 2, 2021

(86) PCT No.: PCT/FI2021/050839
§ 371 (c)(1),
(2) Date: Apr. 21, 2022

(87) PCT Pub. No.: WO2022/123111
PCT Pub. Date: Jun. 16, 2022

(65) Prior Publication Data
US 2022/0364004 A1   Nov. 17, 2022

(30) Foreign Application Priority Data
Dec. 11, 2020 (FI) .................. 20206282

(51) Int. Cl.
*C10L 1/08* (2006.01)

(52) U.S. Cl.
CPC .......... *C10L 1/08* (2013.01); *C10G 2300/304* (2013.01); *C10G 2300/307* (2013.01); *C10G 2400/04* (2013.01); *C10L 2200/0469* (2013.01); *C10L 2270/026* (2013.01)

(58) Field of Classification Search
CPC ............. C10L 1/08; C10L 2200/0469; C10G 2400/04
See application file for complete search history.

(56) References Cited

U.S. PATENT DOCUMENTS

| 2005/0165261 A1* | 7/2005 | Abazajian ................. C10L 1/08 208/950 |
| 2010/0160698 A1* | 6/2010 | Perego ................... B01J 23/883 502/164 |
| 2019/0218466 A1 | 7/2019 | Slade et al. |

FOREIGN PATENT DOCUMENTS

| EP | 1741768 A1 | 1/2007 |
| WO | 2019197720 A1 | 10/2019 |
| WO | 2020201614 A1 | 10/2020 |

OTHER PUBLICATIONS

Finnish Search Report issued in corresponding Patent Application No. 20206282 dated Mar. 12, 2021.
Hancsók et al., "Sustainable production of bioparafns in a crude oil re nery", Clean Techn Environ Policy, vol. 16, Mar. 30, 2014, pp. 1445-1454.
International Search Report (PCT/ISA/210) and Written Opinion (PCT/ISA/237) dated Feb. 22, 2022, by the European Patent Office as the International Searching Authority for International Application No. PCT/FI2021/050839.
Sinthavarayan, "Fractionation and Characterization of Renewable Paraffinic Solvents", Mater's thesis, Aalto University,, Aug. 1, 2013, 91 pages.
Zeman et al., "Hydrotreated Vegetable Oil as a Fuel from Waste Materials", Catalysts., Apr. 4, 2019, 16 pages.

\* cited by examiner

*Primary Examiner* — Randy Boyer
(74) *Attorney, Agent, or Firm* — Buchanan Ingersoll & Rooney PC (57) ABSTRACT

A renewable hydrocarbon composition as disclosed includes monobranched isoparaffins, dibranched isoparaffins, tri-branched isoparaffins multibranched isoparaffins, and n-paraffins, having carbon numbers from C8 to C30. Said renewable hydrocarbon composition has high cetane number and excellent cold properties. The renewable hydrocarbon composition can be used as diesel fuel or as a diesel fuel component.

24 Claims, 3 Drawing Sheets

RENEWABLE HYDROCARBON COMPOSITION HAVING GOOD CETANE NUMBER AND GOOD COLD PROPERTIES

TECHNICAL FIELD

The present disclosure generally relates to renewable hydrocarbon compositions. The present renewable hydrocarbon composition may be produced from oils and fats of biological origin or from waste materials. The disclosure relates particularly, though not exclusively, to renewable hydrocarbon compositions having good cetane number and cold properties, and thus to be used as a diesel fuel or a diesel fuel component.

BACKGROUND

Environmental interests and an increasing demand for diesel fuel, especially in Europe, encourage fuel producers to employ more intensively available renewable sources. In the manufacture of diesel fuels based on biological raw materials, the main interest has concentrated on vegetable oils and animal fats comprising triglycerides of fatty acids. Long, straight and mostly saturated hydrocarbon chains of fatty acids resemble the hydrocarbons present in diesel fuels. However, neat vegetable oils display inferior properties, particularly extreme viscosity, poor cold properties and poor oxidation stability which limits their use in transportation fuels.

Undesired oxygen may be removed from fatty acids or their esters by hydroprocessing. During hydroprocessing, particularly hydrodeoxygenation, oxygen containing groups are reacted with hydrogen and removed through formation of water and therefore this reaction is related with high hydrogen consumption. Due to the highly exothermic nature of these reactions, the control of reaction heat is extremely important. Impure plant oil/fat or animal fat/oil, high reaction temperatures, insufficient control of reaction temperature or low hydrogen availability in the feed stream may cause unwanted side reactions, such as cracking, polymerisation, ketonisation, cyclisation and aromatisation, and coking of the catalyst.

The fatty acid composition, size and saturation degree of the fatty acids may vary considerably in feedstocks of different origin. The melting point of bio oil or fat is mainly a consequence of saturation degree. Fats are more saturated than liquid oils and, in this respect, need less hydrogen for hydrogenation of double bonds. Double bonds in a fatty acid chain also promote different kinds of side reactions, such as oligomerisation/polymerisation, cyclisation/aromatisation and cracking reactions, which deactivate catalyst, increase hydrogen consumption and reduce diesel yield.

Hydrolysis of triglycerides produces also diglycerides and monoglycerides, which are partially hydrolyzed products. Diglycerides and monoglycerides are surface-active compounds, which can form emulsions and make liquid/liquid separations of water and oil more difficult. Oils and fats of biological origin and waste materials can also contain other glyceride-like surface-active impurities like phospholipids (for example lecithin), which have phosphorus in their structures. Phospholipids are gum like materials, which can be harmful for catalysts. Natural oils and fats also contain other types of components harmful for catalysts or pose other problems in processing.

The feedstock, thus the oils and fats of biological origin and waste materials, and processing conditions in hydroprocessing effect the hydrocarbon distribution of the product obtainable thereof. The process optimisation is discussed for example in EP1741768A1.

Different hydrocarbons depending on functionalism and carbon number, contribute to different product properties. It is typical to use hydrocarbon blends to obtain desired combinations of properties, since different components may provide either synergistic or antagonistic overall properties.

This is discussed by Zeman et al., in Hydrotreated Vegetable Oil as a Fuel from Waste Materials (Zeman, P. & Hönig, V. & Kotek, M. & Táborský, J. & Obergruber, M. & Mařík, J. & Hartová, V. & Pechout, M. (2019). Catalysts. 9(4). 337, 16 pp.). They describe n-paraffins having a boiling point corresponding to diesel fuel having a higher cetane number than their branched isomers, but on the other hand the isoparaffins having lower solidification points than n-paraffins. They conclude a compromise in the quality of the paraffin-rich fuel: either good combustion properties or good low-temperature properties, but not both simultaneously.

Publication US2019/0218466 discloses a blend comprising 5-95 vol % synthetic paraffinic diesel, 5-95 vol % biodiesel, 0-90 vol % petroleum diesel. As to the hydrocarbon branching and isomer distribution, they report at least 80 wt-% of the iso-paraffins in the hydroprocessed biorenewable feedstock being mono-methyl branched paraffins and less than 30 wt-% are terminal branched (i.e., 2-methyl branched).

Hence, there still is a need for a renewable hydrocarbon composition with improved properties, especially a need for improving the cold properties without compromising cetane number.

SUMMARY

It is an object of the present invention to overcome at least some of the problems encountered in the prior art.

It is a specific object of the present invention to provide a renewable hydrocarbon composition to meet requirements set to diesel fuels, most importantly the cetane number and cloud point.

It is a specific object to provide a renewable hydrocarbon composition having both good cetane number and low cloud point.

The invention is based on surprising findings in evaluation of both the cetane number and cloud points of renewable hydrocarbon compositions comprising n-paraffins and isoparaffins of carbon numbers C8-C30, especially studying their isoparaffin branching and distribution. It was found that a renewable hydrocarbon composition as defined in claim 13 provides a surprisingly good and unpredictable combination of cetane number and cloud point compared to published values.

It is another specific object to provide a renewable hydrocarbon composition useful as a diesel fuel or a diesel fuel component.

According to a first example aspect here is provided a use of a renewable hydrocarbon composition as diesel fuel or as a diesel fuel component as defined in claim 1.

According to a second example aspect here is provided a renewable hydrocarbon composition as defined in claim 13.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

The renewable hydrocarbon composition and a related production process are next described in detail. The characteristics discussed in relation to the renewable hydrocarbon composition as such apply to corresponding composition as a product of the process provided herein.

Renewable Hydrocarbon Composition

As the first aspect of the present disclosure, here is provided a renewable hydrocarbon composition comprising:
   monobranched isoparaffins from 30 wt % to 50 wt % of the total hydrocarbon composition weight, each monobranched isoparaffin comprising exactly one alkyl group,
   sum of di- and tribranched isoparaffins from 40 wt % to 60 wt % of the total hydrocarbon composition weight, each dibranched isoparaffin comprising exactly two alkyl groups and each tribranched isoparaffin comprising exactly three alkyl groups,
   from 5 wt % to 15 wt % of the sum of multibranched isoparaffins, each multibranched isoparaffin comprising more than three alkyl groups; and
   from 2 wt % to 20 wt % of n-paraffins,
wherein said isoparaffins and n-paraffins have carbon numbers from C8 to C30 and of said isoparaffins and n-paraffins from 85 to 98 wt %, preferably from 90 to 98 wt % have carbon numbers from C15 to C30.

The inventors found that, the specific combination of n-paraffinic and said isoparaffinic hydrocarbons in the renewable hydrocarbon composition provide unexpected synergistic characteristics, especially as to improved cetane number and attractively low cloud point, both of which mark a high-quality diesel fuel or diesel fuel component.

According to a preferred embodiment the hydrocarbon distribution by the carbon number is even narrower and the majority of said paraffinic hydrocarbons of the present renewable hydrocarbon composition have carbon numbers between C10 and C30. When produced from renewable feedstocks by hydrotreatment, especially by hydroisomerisation, such a carbon number distribution reflects an effective use of said feed wherein loss to side reactions and/or to light hydrocarbons is minimized. Hence, at least 90 wt-%, preferably at least 94 wt-%, more preferably at least 98 wt-% by the total hydrocarbon composition weight of said isoparaffins and n-paraffins of the composition have carbon numbers from C10 to C30.

As used here, hydroprocessing is understood as catalytic processing of organic material by all means of molecular hydrogen.

Here hydrotreatment as a catalytic process removes oxygen from organic oxygen compounds as water (hydrodeoxygenation, HDO) or as carbon oxides, $CO/CO_2$ (decarboxylation and decarbonylation), sulphur from organic sulphur compounds as dihydrogen sulphide ($H_2S$) (hydrodesulphurisation, HDS), nitrogen from organic nitrogen compounds as ammonia ($NH_3$) (hydrodenitrogenation, HDN), aromatic compounds by conversion to cycloparaffins (hydrodearomatisation, HDA), and halogens, for example chlorine from organic chloride compounds as hydrochloric acid (HCl) (hydrodechlorination, HDCl), typically under the influence of sulphided NiMo or sulphided CoMo catalysts.

Here deoxygenation is understood to mean removal of oxygen from organic molecules, such as fatty acid derivatives, alcohols, ketones, aldehydes or ethers by any means previously described.

Here hydrocracking is understood as catalytic decomposition of organic hydrocarbon materials using molecular hydrogen at high pressures.

Here hydrogenation means saturation of carbon-carbon double bonds by means of molecular hydrogen under the influence of a catalyst.

Here renewable, refers to the origin. Renewable material is understood to be derived from biological, plant or animal sources, or wastes and residues containing the same. The renewable content in a renewable hydrocarbon composition can be determined by $^{14}C$ isotope methods, which enable one skilled in the art to distinguish between fossil and renewable carbon. This method is described in detail in the standard ASTM D6866 (2020), namely the standard test method for determining the biobased content of solid, liquid, and gaseous samples using radiocarbon analysis. Further examples of suitable methods for analyzing the content of carbon from biological or renewable sources are DIN 51637 (2014) or EN 16640 (2017).

Carbon atoms of renewable origin comprise a higher number of $^{14}C$ isotopes compared to carbon atoms of fossil origin. Therefore, it is possible to distinguish between a carbon compound derived from renewable (bio-based) raw material and carbon compounds derived from fossil (fossil based) raw material by analyzing the ratio of $^{12}C$ and $^{14}C$ isotopes. Thus, a particular ratio of said isotopes can be used as a "tag" to identify a renewable carbon compound and differentiate it from non-renewable carbon compounds. The isotope ratio does not change in the course of chemical reactions. Therefore, the isotope ratio can be used for identifying renewable hydrocarbon composition, and products derived thereof, and distinguishing them from non-renewable feeds and products. For the purpose of the present invention, a carbon-containing material, such as a feedstock or product is considered to be of biological i.e. renewable origin if it contains 90% or more modern carbon (pMC), such as 100% modern carbon, as measured using ASTM D6866.

As used herein, a renewable hydrocarbon composition refers to a composition derived from a renewable source or renewable sources and comprising to a large extent paraffins (non-cyclic alkanes), both linear normal paraffins (n-paraffins) and branched isoparaffins (i-paraffins). Here n-paraffins mean normal alkanes or linear alkanes that do not contain any side chains. Said isoparaffins comprise a specific combination of monobranched i-paraffins, di-branched i-paraffins, tri-branched paraffins, i-paraffins comprising more than three branches. The isoparaffins here are alkyl substituted isoparaffins, i.e. isoparaffins wherein the side chain or sidechains, i.e. the branch or branches, are alkyl sidechains, preferably short alkyls, methyl and ethyls. In theory, the number of branches may be determined from a structural formula by first identifying the longest carbon chain, also called the backbone, and then calculating the branches attached to said longest carbon chain. However, in practice, the number of sidechains (branches) can be determined by any suitable analytical method, such as the analytical method described in the example of the present application.

Here, the renewable hydrocarbon composition is obtained from hydrotreated vegetable oil, hydrotreated animal fat, hydrotreated fish fat, hydrotreated fish oil, hydrotreated algae oil, hydrotreated microbial oil, hydrotreated wood and/or other plant based oil, hydrotreated recyclable waste and/or residue or a combination thereof. Preferably, the fresh feed for renewable hydrocarbon composition is selected from plant oils/fats, animal fats/oils, fish fats/oils, fats contained in plants bred by means of gene manipulation, recycled fats of food industry and combinations thereof. Hydrotreating of vegetable oils or animal fats is an alternative process to esterification for producing bio-based diesel fuels. The renewable middle distillate fuels are also referred to as "hydrotreated vegetable oil fuels", "hydrotreated renewable diesels", "renewable paraffinic diesels", "renewable diesels" or "renewable diesel components" instead of "biodiesel," which is reserved for fatty acid methyl esters (FAME).

Chemically hydrotreated renewable hydrocarbon compositions as used herein are mixtures of paraffinic hydrocarbons and have very low quantities of sulfur and very low contents of unsaturated hydrocarbons. Hence the total aromatic hydrocarbon content of the composition is less than 1500 wt-ppm, preferably less than 1300 wt-ppm, more preferably less than 500 wt-ppm with regard to the total hydrocarbon composition weight.

Isoparaffin Characterisation

As used herein, paraffins refer to saturated hydrocarbons, hence alkanes. Consequently, isoparaffins or i-paraffins in general refer to any open chained and branched alkanes. Structurally, isoparaffins contain at least one tertiary or quaternary carbon in their structure. Conversely, n-paraffins consist of primary and secondary carbons only. It is understood, that variation concerning the branches (also referred to as substituents) is wide, comprising variation as to the number, position and type of said branches. However, when referring to monobranched, dibranched—and so on—branched isoparaffins, the substituents or branches to the carbon backbone (the main chain) only are taken into account in determination of said number.

In the present disclosure, the weight percentage of paraffins in the renewable hydrocarbon composition is determined relative to the total weight of the renewable hydrocarbon composition, and the weight percentages of isoparaffins (total wt-% isoparaffins) and normal paraffins in the renewable hydrocarbon composition are determined relative to the total weight of paraffins in the renewable hydrocarbon composition, respectively. Further, in the present disclosure, the weight percentages of monobranched isoparaffins, di- and tribranched isoparaffins, and isoparaffins with more than three branches are determined relative to the total weight of the renewable hydrocarbon composition, respectively. The ratio of the wt-% amount of isoparaffins with exactly one branch to the total wt-% amount of the isoparaffins is, in the present disclosure, determined based on the respective weight percentages which are determined relative to the total weight of the renewable hydrocarbon composition.

The isoparaffins of the present composition can be defined by the degree of their substitution, also referred to as branching. Hence, each of said monobranched isoparaffins comprises exactly one alkyl substituent, each of said dibranched isoparaffins comprises exactly two alkyl substituents, each of said tribranched isoparaffins comprises exactly three alkyl substituents and each of said multibranched isoparaffins comprise more than three alkyl substituents. When referring to "isoparaffins" in general, it is here meant to cover all alkyl-substituted paraffins, hence a sum amount of said monobranched isoparaffins, dibranched isoparaffins, tribranched isoparaffins and multibranched isoparaffins within defined carbon number range.

As used herein, monobranched isoparaffins refer to alkanes containing no more and no less than one branch in the main carbon chain of the molecule. The branch comprises an alkyl substituent. They can alternatively be referred to as alkyl alkanes or monoalkyl alkanes. Since the monobranched isoparaffins of the present composition have their carbon number between C8 and C30, said main chain has typically carbon chain length from C7 to C29, but may contain some shorter carbon backbones, such as C6 or C5, depending on the branch length (C1, C2, C3 etc.).

Correspondingly, dibranched isoparaffins refer to alkanes containing no more and no less than two branches in the main carbon chain of the molecule and tribranched isoparaffins containing no more and no less than three branches in the main carbon chain of the molecule respectively. According to basic rules of organic nomenclature, the longest chain, the main chain, determines the identity of a single compound and branches thereto are mentioned. Here, the di- and tribranched (dialkyl or trialkyl respectively) isoparaffins are defined by their total carbon number, C8 to C30, understanding that each of said alkyl branches may vary from methyl, ethyl, propyl, butyl to further alkyls, or respective isoalkyl substituents.

When referring to the isoparaffin distribution within the total hydrocarbon composition weight, the di- and tribranched isoparaffins are taken into account as a sum amount of di- and tribranched isoparaffins.

The present compositions further comprise alkanes containing more than three branches in the main carbon chain of the molecule, and are referred here as multibranched isoparaffins. Said multibranched isoparaffins may contain four, five, six, seven, eight, nine, ten or more branches. However, the amount of individual isomers as such is of no interest, they rather are grouped together under the definition of multibranched isoparaffins. Here, the multibranched isoparaffins are, like di- and trialkyl paraffins, defined by their total carbon number, C8 to C30, understanding that each of said alkyl branches may vary from methyl, ethyl, propyl, butyl to further alkyls, or respective isoalkyl substituents and as to their position in the main carbon chain. When referring to the isoparaffin distribution within the total hydrocarbon composition weight, the multibranched isoparaffins are taken into account as a sum amount of tetra, penta, hexa, hepta, octa, nona and deca (or higher) alkyl paraffins, and said sum is referred to as the amount of multibranched isoparaffins.

The substitution preferably takes place at a terminal position or terminal positions of the isoparaffin main chain, wherein more than 60 wt %, preferably more than 70 wt %, most preferably more than 94 wt % of the beta carbons (β carbons) of said isoparaffins are substituted with at least one alkyl substituent. As used herein, the beta carbon refers to the 2-carbon, which in practice is the first carbon which may have an alkyl substituent. When numbering the main chain of an alkane, starting from 1 (alpha, α), continuing to 2, (beta, β), the last carbon of said main chain is denoted as omega, ω. While substitution at the ultimate terminal carbon(s) of the paraffinic carbon chain is preferred, nearly equally beneficial are substitutions to carbons next to said ultimate terminal carbon, hence to the 3-carbon or 4-carbon or to positions ω–2 or ω–3 respectively.

Correspondingly, the position in the main chain of the last carbon in order of numbering, which may have an alkyl substituent, is here referred to as ω–1. In other words, if the isoparaffin main chain is branched or substituted at the other terminus as well, the position of the preferred substitution is referred to as "the (ω–1) carbon". According to an embodiment, more than 84 wt-%, preferably more than 88 wt-%, more preferably more than 92 wt-%, most preferably more than 97 wt-% of the dibranched, tribranched and multi-branched isoparaffins of the present composition are each substituted with at least two methyl substituents in positions selected from beta carbons, (ω–1) carbons or combinations thereof. It is understood that in the case of two methyl substituents, they may both be substituents to the beta carbon or one to beta carbon and one to (ω–1) carbon. Respectively, in the case of three methyl substituents, two of them may be substituents to the beta carbon or one to beta carbon and one to (ω–1) carbon, and the third to a further position. In the case of multibranched isoparaffins, it is sufficient that two of substituents are situated in the terminal positions, hence two of them may be substituents to the beta carbon or at least one substituent to the beta carbon and one to (ω–1) carbon, and the rest distributed to either the same or further positions.

However, substitution(s) substantially to the middle of the carbon chain appear not to contribute to the advantages found in the present disclosure. Without being bound to a theory, the inventors found that isoparaffins having their branch or branches at the terminal position of the carbon chain mimic the behavior seen to the n-paraffins as to the cetane number at the same time contributing to excellent cold properties, i.e. low cloud point.

The preferred substituents of the isoparaffins are the shortest alkyls, and hence more than 90 wt-%, preferably more than 94 wt-%, more preferably more than 96 wt-%, most preferably more than 98 wt-% of said alkyls are selected from methyl substituents and ethyl substituents. The most common alkyl branch or substituent is methyl. Hence, the predominant monobranched isoparaffins can be characterized as methyl-alkanes, dibranched isoparaffins can be characterized as dimethyl-alkanes, and tribranched isoparaffins can be characterized as tridimethyl-alkanes respectively. According to an embodiment, the substituents of the isoparaffins of the present composition are characterized by more than 95 wt-%, more preferably more than 96 wt-%, most preferably more than 97 wt-% of the beta carbons of said isoparaffins are substituted with at least one alkyl, preferably with at least one methyl substituent.

The present composition further comprises n-paraffins, also known as straight-chained alkanes. The n-paraffins contribute to the characteristics, especially to the cetane number of the renewable hydrocarbon composition, and hence the presence in an amount form 2 wt % to 20 wt % of the total hydrocarbon composition weight is thereby beneficial.

Monobranched isoparaffins, particularly monomethyl substituted isoparaffins, also promote cetane number of the renewable hydrocarbon composition. It is therefore preferred that the renewable hydrocarbon composition comprises at least 30 wt-%, preferably at least 35 wt-%, further preferably at least 40 wt-%, more preferably at least 45 wt-%, and up to 50 wt-% monobranched isoparaffins of the total weight of the renewable hydrocarbon composition. The present inventors have found that according to a preferred embodiment of the present renewable hydrocarbon composition, the ratio of wt-% amount of the monoisoparaffins to the total wt-% amount of the isoparaffins is from 0.3 to 0.9, preferably from 0.35 to 0.8 and more preferably from 0.4 to 0.6. Based on the experiments conducted, a significant content of monobranched isoparaffins contributes to the good cetane number measured for the renewable hydrocarbon composition samples studied.

The renewable hydrocarbon composition has preferably a high paraffin content. A high paraffin content promotes a high-quality diesel product. Therefore, in certain embodiments, the renewable hydrocarbon composition comprises at least 75 wt-%, preferably at least 80 wt-%, more preferably at least 90 wt-%, even more preferably at least 95 wt-% paraffins of the total weight of the renewable hydrocarbon composition, wherein of said paraffins 79-95 wt-% are isoparaffins. The wt-% amount of paraffins in the renewable hydrocarbon composition may be selected from about 65 wt-%, 70 wt-%, 75 wt-%, 80 wt-%, 85 wt-%, 90 wt-%, 95 wt-%, and 99 wt-% of the total weight of the renewable hydrocarbon composition.

The isoparaffins and n-paraffins of the present composition have carbon numbers from C8 to C30. Characteristic for said composition is the relatively high amount of carbon numbers of C15+, in other words, of said isoparaffins and n-paraffins of the composition, from 85 to 98 wt %, preferably from 90 to 98 wt % have carbon numbers from C15 to C30.

According to a preferred embodiment, at least 90 wt-%, preferably at least 94 wt-%, more preferably at least 98 wt-% of the total hydrocarbon composition weight, of said isoparaffins and n-paraffins of the composition have carbon numbers from C10 to C20 and at the same time, from 85 to 98 wt %, preferably from 90 to 98 wt % have carbon numbers from C15 to C30.

The experimental results have shown the present composition having the cetane number from 74 to 84 when measured according to EN 15195-2014.

It was surprising that along with these good cetane numbers, the present renewable hydrocarbon composition had a cloud point from –25 to –40° C. when measured according to ASTM D 5771-2017. Said cloud point meets requirements set to high quality diesels as such and allows the use of the present renewable hydrocarbon composition as a blend component in a wide variety of blend ratios. Alternative methods for defining the cloud point are methods by ASTM D2500, D5772, D5773, D7689, and EN 23015.

Sufficient cold temperature performance all year round is an essential requirement for diesel fuel. Due to large seasonal and geographic temperature variability, diesel fuels are blended and adjusted to minimize problems during cold weather such as crystallisation and solidification of the fuel which affects the viscosity of the fuel, its volatility, and its ability to pass through fuel filters.

The most important properties of fuels related to their cold temperature operability are cloud point, pour point, and cold filter plugging point. As a diesel fuel is cooled, it will reach its cloud point. This is the temperature at which paraffin wax falls out of solution and starts to form wax crystals in the fuel. The storage temperature of a fuel is recommended to be higher than its cloud point. As the fuel is further cooled, it will eventually reach its pour point. This is the temperature at which the fuel will no longer flow or the point at which the fuel gels or turns into a solid.

As measured properties, the present renewable hydrocarbon composition has a density at 15° C. of 770-790 kg/m$^3$ measured according to EN ISO 12185. The present hydrocarbon composition has a boiling point in a range of 170° C. to 360° C. measured according to EN ISO 3405.

According to the second aspect of the present disclosure, herein is provided a use of a renewable hydrocarbon composition as diesel fuel or as a diesel fuel component. Embodiments of said use may be characterized by following numbered items corresponding to details and advantages as presented in relation to the renewable hydrocarbon composition.

1. Use of a renewable hydrocarbon composition as diesel fuel or as a diesel fuel component.
2. The use according to item 1, wherein a renewable hydrocarbon composition comprises:
   monobranched isoparaffins from 30 wt % to 50 wt % of the total hydrocarbon composition weight, each monobranched isoparaffin comprising exactly one alkyl substituent,
   sum of di- and tribranched isoparaffins from 40 wt % to 60 wt % of the total hydrocarbon composition weight, each dibranched isoparaffin comprising exactly two alkyl substituents and each tribranched isoparaffin comprising exactly three alkyl substituents,
   from 5 wt % to 15 wt % of the sum of multibranched isoparaffins, each multibranched isoparaffin comprising more than three alkyl substituents; and
   from 2 wt % to 20 wt % of n-paraffins,
   wherein said isoparaffins and n-paraffins have carbon numbers from C8 to C30 and of said isoparaffins and n-paraffins from 85 to 98 wt %, preferably from 90 to 98 wt % have carbon numbers from C15 to C30.
3. The use according to item 1 or 2, wherein of said isoparaffins and n-paraffins, at least 90 wt-%, preferably at least 94 wt-%, more preferably at least 98 wt-% by the total hydrocarbon composition weight, have carbon numbers from C10 to C30.
4. The use according to any of preceding items, wherein more than 60 wt %, preferably more than 70 wt %, most preferably more than 94 wt % of the beta carbons of said isoparaffins are substituted with at least one alkyl substituent.
5. The use according to any of preceding items, wherein more than 90 wt-%, preferably more than 94 wt-%, more preferably more than 96 wt-%, most preferably more than 98 wt-% of said alkyl substituents are selected from methyl and ethyl substituents, preferably methyl substituents.
6. The use according to any of preceding items, wherein more than 95 wt-%, more preferably more than 96 wt-%, most preferably more than 97 wt-% of the beta carbons of said isoparaffins are substituted with at least one alkyl, preferably with at least one methyl substituent.
7. The use according to any of preceding items, wherein the ratio of wt-% amount of the monobranched isoparaffins to the total wt-% amount of the isoparaffins is from 0.3 to 0.9, preferably from 0.35 to 0.8 and more preferably from 0.4 to 0.6.
8. The use according to any of preceding items, wherein more than 84 wt-%, preferably more than 88 wt-%, more preferably more than 92 wt-%, most preferably more than 97 wt-% of the dibranched, tribranched and multibranched isoparaffins are each substituted with at least two methyl substituents in positions selected from beta carbons, (ω−1) carbons or combinations thereof.
9. The use according to any of preceding items, wherein the cloud point of said composition is from −25 to −40° C. when measured according to ASTM D 5771-2017.
10. The use according to any of preceding items, wherein the cetane number of said composition is from 74 to 84 when measured according to EN 15195-2014.
11. The use according to any of preceding items, wherein the density at 15° C. of said composition is within range of 770-790 kg/m$^3$ measured according to EN ISO 12185.
12. The use according to any of preceding items, wherein the composition has a boiling point in a range of 170° C. to 360° C. measured according to EN ISO 3405.
13. The use according to any of preceding items, wherein the total aromatic hydrocarbon content of the composition is less than 1500 wt-ppm, preferably less than 1300 wt-ppm, more preferably less than 500 wt-ppm with regard to the total hydrocarbon composition weight.

When the renewable hydrocarbon composition is used as a diesel fuel or a diesel fuel component, the diesel fuel or the diesel fuel component is characterized by analogous distillation properties to conventional diesel. Hence, said composition begins to distil at a temperature of at least 150° C., at least 160° C. or at least 170° C. Distillation may be completed at 350° C. or less, 345° C. or less or 340° C. or less. It is preferable that at least 95 vol. %-of the composition is distilled at temperatures up to 360° C. EN15940 specifies a minimum distillate quantity of 85 vol. % at 350° C. for diesel fuels (test method EN ISO 3405). A renewable hydrocarbon composition as described herein is obtainable by any means known to a man skilled in the art. For example, a renewable hydrocarbon composition can be prepared in a laboratory by mixing known components to meet given paraffin distributions. However, the present inventors found that, the desired n-paraffin and isoparaffin distribution with beneficial isomer characteristics, may be obtained as a direct product recovered from process next defined in detail providing a preferred process for obtaining the renewable hydrocarbon composition as to the isomerisation degree as well as to the position of the alkyl substituents in the carbon main chain.

Process for Producing a Renewable Hydrocarbon Composition

As another aspect of the present disclosure, herein is provided a process for producing a renewable hydrocarbon composition. The process is next briefly described in general, then as a stepwise process and finally, discussing the details, partial processes, and variables therein.

The renewable hydrocarbon composition of the present invention may be produced from renewable sources, such as oils/fats/greases, by a process comprising a hydrotreating step and an isomerisation step. Particularly said process concerns a transformation of the starting materials comprising triglycerides, fatty acids and derivatives of fatty acids or combinations thereof, into n-paraffins, and converting the obtained n-paraffins into branched alkanes using isomerisation. Typically the hydrotreating step is carried out contacting the feed comprising fresh feed and at least one diluting agent with a hydrotreatment catalyst under hydrotreatment conditions, and then the obtained product is isomerised with an isomerisation catalyst under isomerisation conditions. In specific embodiments hydrotreating and isomerization may take place essentially concurrently.

When presented as a stepwise process, a process for producing the renewable hydrocarbon composition of the present disclosure, comprises providing a renewable feedstock;
subjecting the feedstock to hydrotreatment and hydroisomerisation reactions, the hydroisomerisation reaction conditions comprising
 a catalyst system comprising a molecular sieve and a noble metal catalyst;
 a temperature from 200-500° C., such as 280-400° C., such as 280-370° C.,
 preferably 300-370° C., such as 340-370° C.; and
recovery of a renewable hydrocarbon composition as defined in more detail in the attached claims.

Feedstock of Biological Origin

Feedstock of biological origin i.e. renewable feedstock refers to feedstock derived from biological raw material.

The oil, grease and/or fat used as the fresh feed in the process of the present invention originates from renewable sources, such as fats and oils (usually containing lipids e.g. fatty acids or glycerides) from plants and/or vegetables and/or animals and/or fish and/or algae and/or fats and oils from microbial processes and compounds derived therefrom. The basic structural unit of a typical plant or vegetable or animal oil/fat/grease useful as the feedstock is a triglyceride, which is a triester of glycerol with three fatty acid molecules.

Suitable plant and vegetable oils, greases and fats, animal fats, fish oils, and mixtures thereof contain fatty acids and/or fatty acid esters (including mono, di, and triglycerides). Plant and/or vegetable oils and/or microbial oils may include babassu oil, carinata oil, soybean oil, canola oil, coconut oil, rapeseed oil, crude tall oil (CTO), tall oil (TO), tall oil fatty acid (TOFA), tall oil pitch (TOP), palm oil (PO), palm oil fatty acid distillate (PFAD), jatropha oil, palm kernel oil, sunflower oil, castor oil, camelina oil, archaeal oil, bacterial oil, fungal oil, protozoal oil, algal oil, seaweed oil, oils from halophiles, and mixtures of any two or more thereof. These oils may have been classified as crude, degummed, and RBD (refined, bleached, and deodorized) grade, depending on the level of pretreatment, and residual phosphorus and metals contents. Animal fats and/or oils may include inedible tallow, edible tallow, technical tallow, floatation tallow, lard, poultry fat, poultry oils, fish fat, fish oils, and mixtures of any two or more thereof. Greases may include yellow grease, brown grease, waste vegetable oils, restaurant greases, trap grease from municipalities such as water treatment facilities, and spent oils from industrial packaged food operations, and mixtures of any two or more thereof.

The oils, greases and/or fats of biological origin may include a single kind of oil, single kind of grease, a single kind of fat, mixtures of different oils, mixtures of different greases, mixtures of different fats, mixtures of oil(s), grease(s) and fat(s), fatty acids, glycerol, and/or mixtures of the aforementioned. Typically, when waste and residue material are used, they comprise mixtures of several components.

The oils, greases and fats suitable as fresh feed typically comprise C12-C24 fatty acids and derivatives thereof, including esters of fatty acids, glycerides, i.e. glycerol esters of fatty acids. The glycerides may specifically include monoglycerides, diglycerides and triglycerides. Fatty acids or fatty acid derivatives, such as esters may be produced via hydrolysis of the oils, greases and/or fats, or by fractionation or transesterification reactions of triglycerides.

In many cases the feedstock, such as crude plant oil or animal fat, is not suitable as such in processing because of high impurity content and thus the feedstock is preferably purified using suitably one or more conventional purification procedures before introducing it to the hydrotreating step of the process. Examples of some conventional procedures comprise degumming, refining, bleaching, prehydrogenating of plant oils/fats and animal oils/fats or any combination thereof.

Depending on level of pretreatment, fats, greases and oils may contain minor contents of impurities. In order to avoid catalyst deactivation and undesired side reactions the feed shall comply with some, preferably all of the following requirements, below 30, preferably below 15 and most preferably below 5 w-ppm phosphorus and below 10, preferably below 5 and most preferably below 1 w-ppm total metals, mainly sodium, potassium, magnesium, calcium, iron, and copper.

The process for producing a renewable hydrocarbon composition is particularly advantageous when the fresh feed contains more than 5%-vol free fatty acids and even more than 10%-vol free fatty acids. Thus, also naturally occurring fats and oils containing significant amounts of free fatty acids can be processed without the removal of free fatty acids.

In the following some process details optionally applicable in the present process comprising a hydrotreatment step and an hydroisomerisation step, or a combination thereof, are described in more detail.

Hydrotreatment

In the present invention, the deoxygenating method is not particularly limited and any suitable method may be employed. Suitable methods are, for example, hydrotreating, such as hydrodeoxygenation (HDO), catalytic hydrodeoxygenation (catalytic HDO), catalytic cracking (CC), or a combination thereof. Other suitable methods include decarboxylation and decarbonylation reactions, either alone or in combination with hydrotreating.

Hydrotreatment typically serves as a deoxygenation, denitrogenation, and desulfurisation treatment of the fatty acids, fatty acid derivatives, and/or the glycerides comprised in the renewable feedstock. Hydrogen contributes to removal of oxygen from organic oxygen compounds in the form of water, to removal of sulfur from organic sulfur compounds in the form of dihydrogen sulfide ($H_2S$), to removal of nitrogen from organic nitrogen compounds in the form of ammonia ($NH_3$) and to removal of halogens from organic halogen compounds, for example chlorine in the form of hydrochloric acid (HCl). Further, the renewable feedstock may be subjected to decarboxylation and decarbonylation reactions (i.e. removal of oxygen in the form of COx). With the oils, greases and/or fats used as the fresh feed in the present process, the most relevant reaction is removal of oxygen heteroatoms from the fatty structures, thus hydrodeoxygenation forming mainly n-paraffins.

In one embodiment, the hydrotreatment is hydrodeoxygenation (HDO), or catalytic hydrodeoxygenation (catalytic HDO). The hydrotreatment is preferably performed at a pressure selected from the range 1-15, 2-12 MPa, preferably 3-10 MPa, and at a temperature selected from the range 200-400° C., preferably 250-380° C., more preferably 280-360° C. The hydrotreatment may be performed in the presence of known hydrotreatment catalysts containing metals from Group VIII and/or VIB of the Periodic System.

Preferably, the hydrogenation catalysts are supported Pd, Pt, Ni, NiMo or a CoMo catalyst, the support being alumina and/or silica, as described for instance in FI 100248. Examples of typical catalysts for hydrodeoxygenation are molybdenum containing catalysts, such as NiMo, CoMo, CoNiMo, or NiW catalysts, supported on alumina or silica. The hydrodeoxygenation is preferably carried out under the influence of sulphided NiMo or sulphided CoMo or NiW catalysts in the presence of hydrogen gas. Typically, NiMo/Al$_2$O$_3$ and CoMo/Al$_2$O$_3$ catalysts are used. The process may be implemented controlling the temperature increase resulting from the aforementioned reactions over catalyst beds and side reaction formation, by an optional reactor configuration. Then, the hydrotreatment section comprises one or more catalyst beds in series, dilution agent introduction on the top of the first catalyst bed and fresh feed, recycle liquid and hydrogen introduction on top of each catalyst beds. The catalyst beds can be located in same pressure vessel or each bed in a separate pressure vessel. Hydrogen is fed in excess to the theoretical chemical hydrogen consumption and the feedstock is converted totally or almost totally within each catalyst bed. Using these procedures, harmful, partially converted product intermediates are avoided, the temperature needed for reaction initiation is achieved in the beginning of each catalyst bed, the rise of reaction heating is controlled in the catalyst beds and the catalyst life is improved considerably.

Hydrodeoxygenation of triglycerides facilitates controlled decomposition of the triglyceride molecule contrary to uncontrolled cracking. Double bonds are also hydrogenated during the controlled hydrotreatment. Light hydrocarbons and gases formed, mainly propane, water, CO$_2$, CO, H$_2$S and NH$_3$ are removed from the hydrotreated product.

At least some of the n-paraffins formed in hydrotreatment reactions are subjected to isomerisation.

Hydroisomerisation

In the isomerisation of the process, isomerisation reactions lead to branching of the hydrocarbon chains. The severity of isomerisation conditions and choice of catalyst control the amount of methyl branches formed and their distance from one other in the carbon backbone, and thereby the characteristics, such as cold properties of the renewable hydrocarbon composition produced.

The renewable hydrocarbon composition of the present invention may be provided by subjecting at least a portion, or all, of the n-paraffins formed in the hydrotreatment step to an isomerisation treatment to form i-paraffins and to produce the renewable hydrocarbon composition. Preferably, subjecting the n-paraffins formed in the hydrotreatment step from the renewable feedstock to an isomerisation treatment forms predominantly methyl substituted isoparaffins. The isomerisation step may comprise further intermediate steps such as a purification step and/or a fractionation step. Purification and/or fractionation steps allows better control of the properties of the renewable hydrocarbon composition being formed.

In certain embodiments, only a portion of the n-paraffins formed in the hydrotreatment step is subjected to an isomerisation treatment. A portion of the n-paraffins formed in the hydrotreatment step may be separated, the separated n-paraffins then subjected to the isomerisation treatment to form i-paraffins. After being subjected to the isomerisation treatment, the separated paraffins are optionally re-unified with the remainder of the paraffins. Alternatively, all of the n-paraffins formed in the hydrotreatment step may be subjected to the isomerisation treatment to form i-paraffins.

The isomerisation treatment is a step which predominantly serves to isomerise the paraffins of the renewable hydrocarbon composition. While most thermal or catalytic conversions (such as hydrotreatment and HDO) result in a minor degree of isomerisation (usually less than 5 wt-%), the isomerisation step employed in the present invention is the step which leads to a significant increase in the isoparaffin content of the renewable hydrocarbon composition. After fractionation and/or product stabilisation, the present renewable hydrocarbon composition may comprise only from 2 wt % to 20 wt % of n-paraffins. Typically, the carbon number distribution does not substantially change during the isomerisation treatment. Accordingly, the wt-% amount of paraffins in the range of carbon numbers C3-C14 does not substantially increase in the course of the isomerisation treatment. This is favourable, as it means minimal losses for isoparaffins with carbon numbers from C15 to C30 into lighter hydrocarbons during isomerisation.

The isoparaffin content and the types of isoparaffins (number, position and carbon number in the branches) in the renewable hydrocarbon composition are mainly controlled by the isomerisation treatment; e.g. the catalyst, the temperature, the pressure, the residence time, the catalyst age, and the amount of added hydrogen in the isomerisation process. In certain embodiments, providing the renewable hydrocarbon composition comprises analysing the renewable hydrocarbon composition obtained from the isomerisation treatment, and, based on the analysis results, selecting a renewable hydrocarbon composition fulfilling the previously described requirements.

Preferably, analysing the renewable hydrocarbon composition comprises determining the wt-% paraffins in the renewable hydrocarbon composition, determining the wt-% isoparaffins in the renewable hydrocarbon composition, determining the ratio of the wt-% amount of monoisoparaffins to the total wt-% amount of the isoparaffins in the renewable hydrocarbon composition, and determining the carbon number distribution of the isoparaffins in the renewable hydrocarbon composition. Analysing the renewable hydrocarbon composition further comprises determining the wt-% n-paraffins in the renewable hydrocarbon composition, and/or determining the weight percentages of mono-branched isoparaffins, di- and tribranched isoparaffins, and isoparaffins with more than three branches, respectively. The weight percentages of paraffins, isoparaffins, n-paraffins, as well as of monobranched isoparaffins, di- and tribranched isoparaffins, and isoparaffins with more than three branches may be determined with any suitable method, for example using GC-FID analysis, such as the analytical method described in the Example.

In the production process the feed into the isomerisation reactor is a mixture of n-paraffins of different carbon chain lengths, and the composition thereof can be predicted from the fatty acid distribution of individual oils/fats/greases.

The isomerisation step may comprise an optional stripping step, wherein the reaction product from the hydrotreatment step may be purified by stripping with water vapour or a suitable gas such as light hydrocarbon, nitrogen or hydrogen. The optional stripping step is carried out in counter-current manner in a unit upstream of the isomerisation catalyst, wherein the gas and liquid are contacted with each other, or before the actual isomerisation reactor in a separate stripping unit utilizing the counter-current principle.

In the isomerisation step, preferably by hydroisomerisation, the temperature varies between 200-500° C., such as 280-400° C., such as 280-370° C., such as 300-370° C., such as 340-370° C. In a specific embodiment, the hydroisomerisation is performed at a temperature of 300° C. or above, preferably at 300-370° C., such as 340-370° C. The reaction conditions may further comprise a pressure in the range from 2 and 15 MPa, preferably between 2 and 10 MPa; a WHSV in the range from 0.5 to 3 h$^{-1}$, a H$_2$ flow in the range from 100 to 800 nl H$_2$/l feed, or a combination thereof.

Hydroisomerisation Catalyst System

The isomerisation is performed, for example, in the presence of one or more catalyst(s) comprising a Group VIII metal on a support, where the support is selected from silica, alumina, clays, titanium oxide, boron oxide, zirconia, which can be used alone or as a mixture thereof, preferably silica and/or alumina. The hydroisomerisation catalyst may contain SAPO-11 or SAPO-41 or ZSM-22 or ZSM-23 or fernerite and Pt, Pd or Ni and Al$_2$O$_3$ or SiO$_2$.

Typical isomerisation catalysts are, for example, PtSAPO-11/Al$_2$O$_3$, Pt/ZSM-22/Al$_2$O$_3$, PUZSM-23/Al$_2$O$_3$ and Pt/SAPO-11/SiO$_2$. The catalysts may be used alone or in combination. The presence of added hydrogen is particularly preferable to reduce catalyst deactivation. In a preferred embodiment, the isomerization catalyst is a noble metal bifunctional catalyst, such as Pt-SAPO and/or Pt-ZSM-catalyst, which is used in combination with hydrogen. A specifically preferable combination comprises Pt/SAPO-11/Al$_2$O$_3$.

The formation of the specific renewable hydrocarbon composition can be explained with the bifunctional characteristics of the catalyst system having both the noble metal for the dehydrogenation-hydrogenation activity, and proton form the molecular sieve contributing to the hydroisomerisation activity. The dehydrogenation-hydrogenation equilibrium is shifted towards dehydrogenation activity when reaction temperature is risen. This enables the initiation of paraffin activation and acceleration of carbenium ion formation. The carbenium ions are further isomerised at Bronsted acid sites of the molecular sieve catalyst. The isomerised carbenium ions are hydrogenated to isoparaffins. The increased dehydrogenation is responsible for the increased yield of isomers at higher reaction temperatures. The hydrogen is however sufficient to saturate carbenium ions (both not isomerised and isomerised) to yield saturated isoparaffins.

According to specific embodiments, both the hydrodeoxygenation step and the isomerization step may be conducted in the same reactor, and even in the same reactor bed. The hydroisomerisation catalyst may be a noble metal bifunctional catalyst such as a Pt containing commercial catalyst, for example Pt-SAPO or Pt-ZSM-catalyst or for example a non-noble catalyst, such as NiW. The hydrodeoxygenation and hydroisomerization steps may be performed in the same catalyst bed using e.g. the NiW catalyst in both the hydrodeoxygenation and isomerisation.

The present inventors have found that increased isomer contents in the process can be achieved only when the catalyst has been at said reaction conditions for a certain minimum period of time. Catalyst is "aged" in the hydroisomerisation process. In other words, the desired renewable hydrocarbon composition as defined here, is believed not being obtainable with a "fresh catalyst". Said "fresh catalyst" is a term used in the field to define a catalyst newly introduced (at time point 0) to the catalytic process. To be specific, the reaction conditions require a catalyst system comprising a molecular sieve and a noble metal catalysts, that have been at hydroprocessing conditions for at least 4 days, preferably for 8 days, more preferably for 10 days to produce the desired distribution of n-paraffins with mono-, di and tri, and multibranched isoparaffins.

Correspondingly, as a direct product of the multistep process, a renewable hydrocarbon composition comprising monobranched isoparaffins from 30 wt % to 50 wt % of the total hydrocarbon composition weight, each monobranched isoparaffin comprising exactly one alkyl group, sum of di- and tribranched isoparaffins from 40 wt % to 60 wt % of the total hydrocarbon composition weight, each dibranched isoparaffin comprising exactly two alkyl groups and each tribranched isoparaffin comprising exactly three alkyl groups, from 5 wt % to 15 wt % of the sum of multibranched isoparaffins, each multibranched isoparaffin comprising more than three alkyl groups; and from 2 wt % to 20 wt % of n-paraffins, wherein said isoparaffins and n-paraffins have carbon numbers from C8 to C30 and of said isoparaffins and n-paraffins from 85 to 98 wt %, preferably from 90 to 98 wt % have carbon numbers from C15 to C30, may be recovered.

Experimental results confirmed the renewable hydrocarbon composition being obtained from process conditions, where the catalyst has been aged and thereby enabling the isomerisation reaction temperature rise.

EXAMPLES

Renewable hydrocarbon compositions were produced by a process where a feedstock comprising oils and fats of biological origin or waste materials was subjected to hydrodeoxygenation and hydroisomerisation reactions. The catalyst system comprised a combination of a SAPO-11 molecular sieve and a Pt-catalyst. The samples were collected form a continuous process, where the catalyst system had been at said reaction process and conditions for at least 4 days, typically more than 10 days. The hydroisomerisation reaction conditions further comprised a temperature of about 340° C.

Renewable hydrocarbon composition samples were analysed as to the cloud point (according to ASTM D 5771-2017) and cetane number (according to EN 15195-2014).

The samples of the renewable hydrocarbon compositions were analysed by gas chromatography (GC). Samples of the renewable hydrocarbon composition were analysed as such, without any pretreatment. The method is suitable for hydrocarbons C2-C36. With very low specific isoparaffin contents, detection was not always sufficient to differentiate between different isoparaffin types within specific carbon number, and they were given as total isoparaffin content instead. N-paraffins and groups of isoparaffins (C1-, C2-, C3-substituted and ≥C3-substituted) were identified using mass spectrometry and a mixture of known n-paraffins in the range of C2-C36. The chromatograms were split into three groups of paraffins (C1-, C2-/C3- and ≥C3-substituted isoparaffins/n-paraffin) by integrating the groups into the chromatogram baseline right after n-paraffin peak. N-paraffins were separated from ≥C3-substituted isoparaffins by integrating the n-alkane peak tangentially from valley to valley and compounds or compound groups were quantified by normalisation using relative response factor of 1.0 to all hydrocarbons. The limit of quantitation for individual compounds was 0.01 wt-%. Settings of the GC are shown in Table 1.

TABLE 1

| Settings of GC determination of n- and i-paraffins. | |
|---|---|
| GC | |
| Injection | split/splitless-injector Split 80:1 (injection volume 0.2 μL) |
| Column | DB ™-5 (length 30 m, i.d. 0.25 m, phase thickness 0.25 μm) |
| Carrrier gas | He |
| Detector | FID (flame ionisation detector) |
| GC program | 30° C. (2 min) - 5° C./min - 300° C. (30 min), constant flow 1.1 mL/min) |

The weight percentages of n-paraffins and isoparaffins in the renewable hydrocarbon composition were measured by gas chromatography and said values for one individual sample are shown in Table 2 as an example. This sample was collected form a continuous process when the catalyst system had been in use at said reaction process for at least 10 days. For paraffins with carbon number C11 or above, the wt-% amounts, based in the total weight of paraffins in the renewable hydrocarbon composition, of n-paraffins, monobranched i-paraffins, di- and tribranched i-paraffins, and i-paraffins with more than three branches were determined. Cloud point measured according to ASTMD7689-17 of this sample was −36.4° C. and the cetane number measured according to EN 15195-2014 was 82.3. Other samples were characterized correspondingly.

TABLE 2

Distribution to different paraffins and carbon numbers of a sample according to the present renewable hydrocarbon composition.

| Sum of WT % | | Isomer | | | | |
|---|---|---|---|---|---|---|
| Carbon number | iP | iP-di/tri-alkyl | iP-alkyl | iP-trialkyl+ | nP | Grand Total |
| 8* | 0.17 | 0.00 | 0.00 | 0.00 | 0.08 | 0.25 |
| 9* | 0.50 | 0.00 | 0.00 | 0.00 | 0.18 | 0.68 |
| 10* | 0.78 | 0.00 | 0.00 | 0.00 | 0.15 | 0.93 |
| 11 | 0.00 | 0.27 | 0.52 | 0.00 | 0.12 | 0.91 |
| 12 | 0.00 | 0.33 | 0.59 | 0.03 | 0.12 | 1.06 |
| 13 | 0.00 | 0.35 | 0.55 | 0.04 | 0.09 | 1.03 |
| 14 | 0.00 | 0.65 | 0.87 | 0.08 | 0.35 | 1.95 |
| 15 | 0.00 | 4.11 | 5.31 | 0.67 | 1.62 | 11.72 |
| 16 | 0.00 | 13.41 | 13.10 | 3.21 | 1.75 | 31.47 |
| 17 | 0.00 | 5.78 | 7.32 | 1.42 | 1.65 | 16.17 |
| 18 | 0.00 | 14.82 | 10.26 | 6.56 | 0.79 | 32.44 |
| 19 | 0.00 | 0.15 | 0.11 | 0.08 | 0.03 | 0.38 |
| 20 | 0.00 | 0.10 | 0.08 | 0.10 | 0.01 | 0.28 |
| 21 | 0.00 | 0.01 | 0.01 | 0.01 | 0.00 | 0.03 |
| 22 | 0.00 | 0.01 | 0.01 | 0.01 | 0.00 | 0.04 |
| 23 | 0.00 | 0.01 | 0.02 | 0.00 | 0.00 | 0.03 |
| 24 | 0.00 | 0.01 | 0.01 | 0.01 | 0.00 | 0.03 |
| C25-C29* | 0.28 | 0.00 | 0.00 | 0.00 | 0.00 | 0.28 |
| C30-C36* | 0.06 | 0.00 | 0.00 | 0.00 | 0.00 | 0.06 |

*Only total i-paraffins given.

Figure 1:
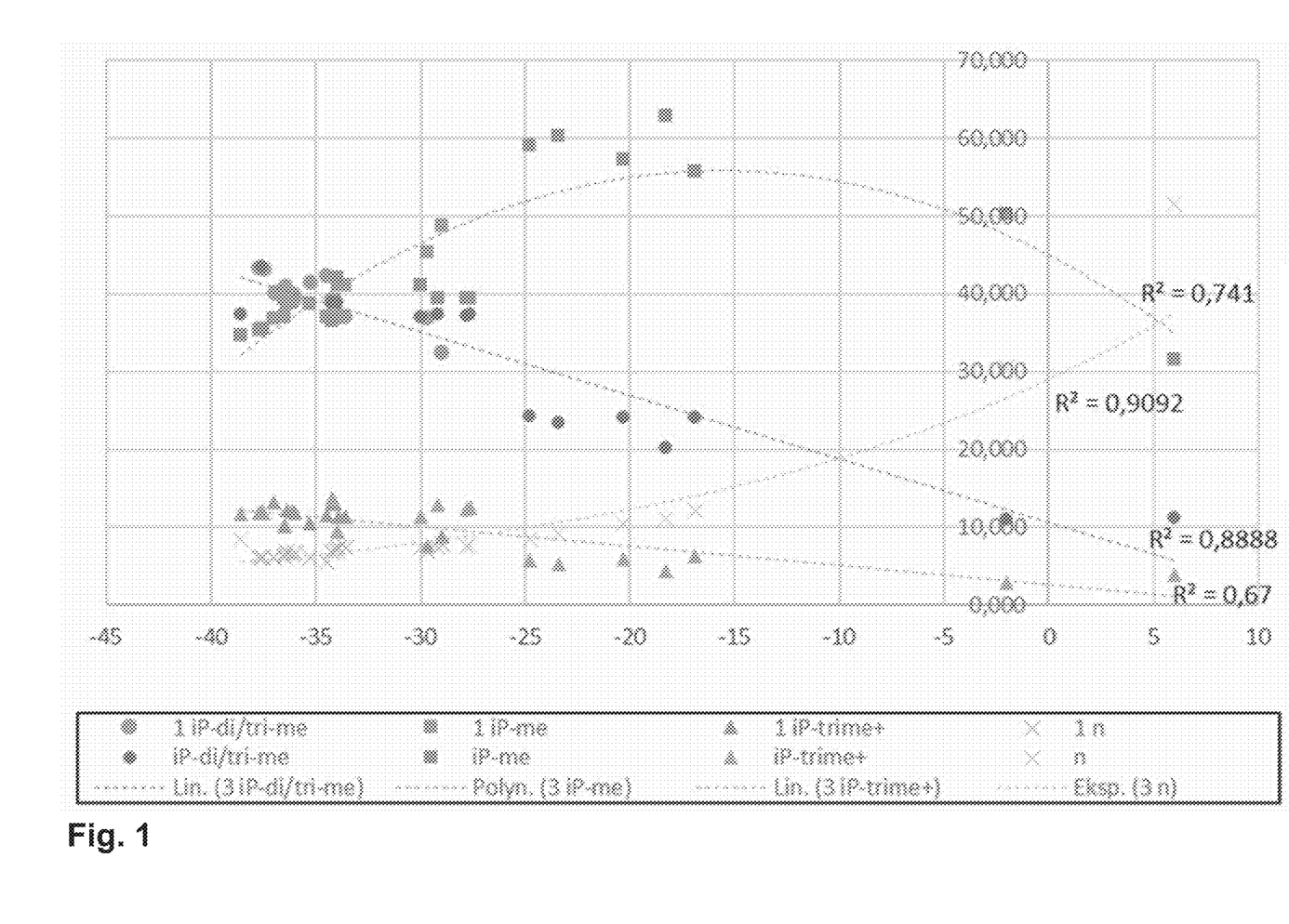
FIG. 1 shows the effect of isomerisation to cloud point in a series of samples having different isomerisation degree. Isomers are characterized as monobranched isoparaffins, di- and tribranched isoparaffins as well as multibranched isoparaffins, and their content of the total renewable hydrocarbon composition projected to the x-axis giving temperatures (t, °C.).
Figure 2:
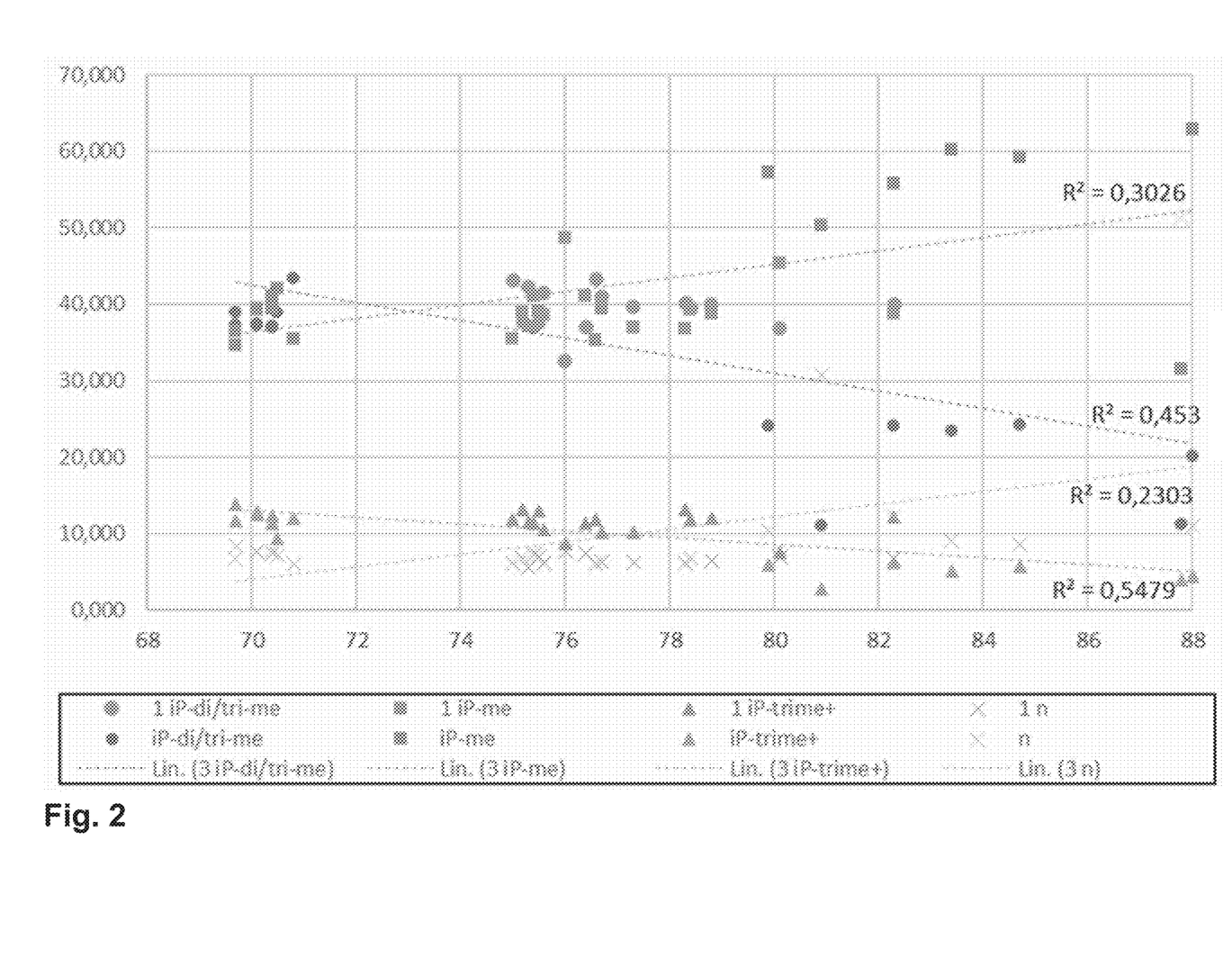
FIG. 2 shows the effect of isomerisation to cetane number in a series of samples having different isomerisation degree. Isomers are characterized as monobranched isoparaffins, di- and tribranched isoparaffins as well as multibranched isoparaffins and their content of the total renewable hydrocarbon composition projected to the x-axis giving the cetane numbers.

The paraffinic hydrocarbon distribution of each sample was analysed by gas chromatography and the results are presented in FIGS. 1 and 2. FIG. 1 gives the amount of hydrocarbon compositions as a function of cloud point of the hydrocarbon. From the figure it can be seen that when the isomerisation degree increases, the cloud point of the sample decreases and the amount of n-paraffins decreases. Along with increasing isomerisation degree, the amount of one methyl branched hydrocarbons, thus the monobranched isoparaffins decreases, and the amount of multibranched hydrocarbons increases.

In FIG. 2, the paraffinic distribution of hydrocarbon compositions as a function of cetane number is shown. When the isomerisation degree increases, several observations can be made: the cetane number decreases, the amount of multibranched hydrocarbons increases, and the amount of monobranched isoparaffins, and n-paraffins decreases.

Figure 3:
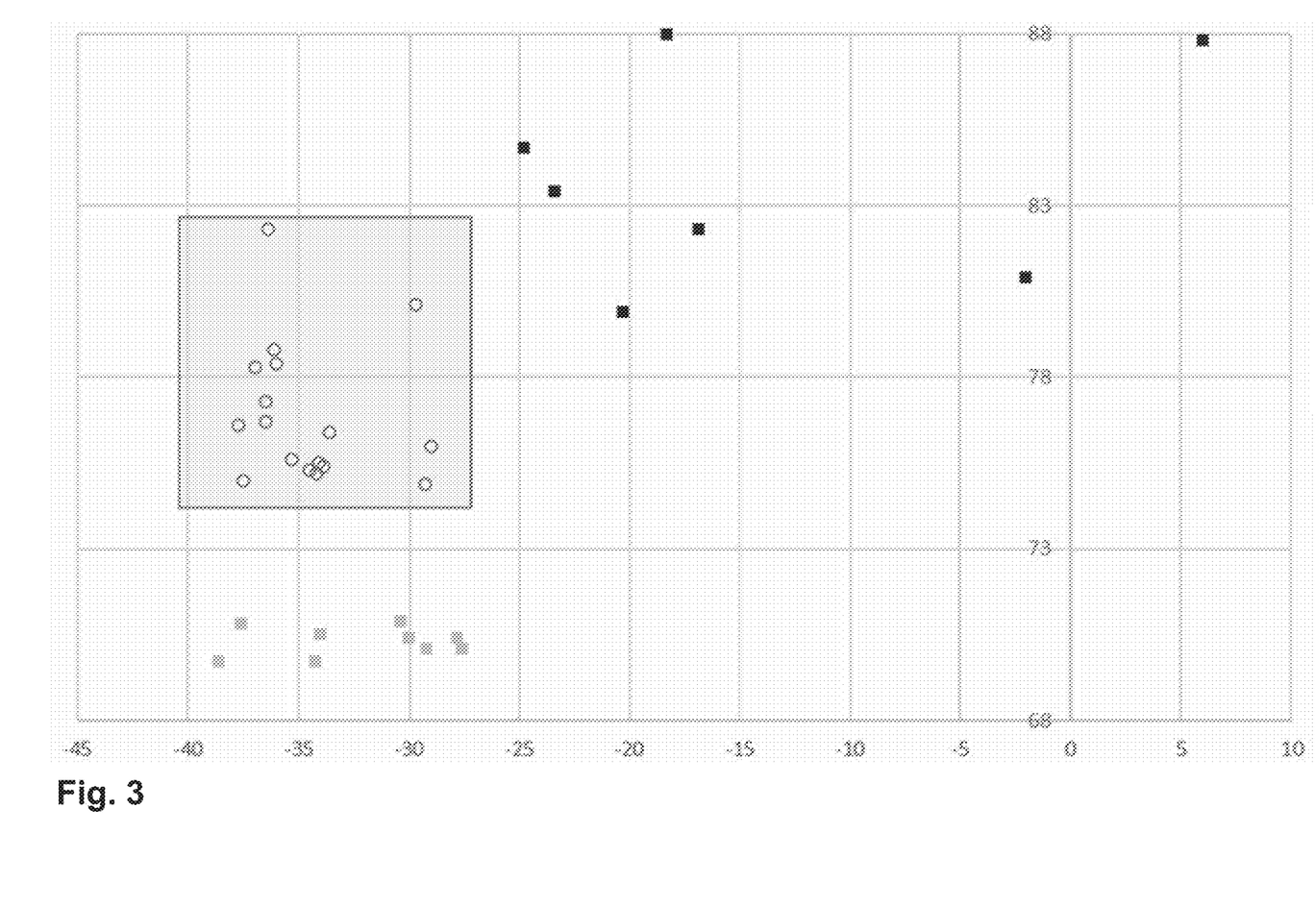
FIG. 3 shows the synergism observed in the present renewable hydrocarbon composition samples (spheres) projecting the cloud point (x-axis, °C.) versus the cetane number (y-axis). As reference, hydrocarbon compositions not meeting the present specifications are given as squares.

When adjusting both the cloud point and the cetane number (FIG. 3), a specific distribution with regard to carbon number and the number of substituents is needed to achieve required properties; good cold properties and good cetane number.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A diesel fuel comprising:
a renewable hydrocarbon composition, wherein said renewable hydrocarbon composition includes:
monobranched isoparaffins constituting from 30 wt % to 50 wt % of a total hydrocarbon composition weight, each monobranched isoparaffin containing exactly one alkyl substituent;
a sum of di- and tribranched isoparaffins constituting from 40 wt % to 60 wt % of the total hydrocarbon composition weight, each dibranched isoparaffin comprising exactly two alkyl substituents and each tribranched isoparaffin containing exactly three alkyl substituents,
from 5 wt % to 15 wt % of a sum of multibranched isoparaffins, each multibranched isoparaffin having more than three alkyl substituents; and
2 wt % to 20 wt % of n-paraffins,
wherein said isoparaffins and n-paraffins have carbon numbers from C8 to C30, and of said isoparaffins and n-paraffins, from 85 to 98 wt % have carbon numbers from C15 to C30.

2. The diesel fuel according to claim 1, wherein of said isoparaffins and n-paraffins, at least 90 wt % by the total hydrocarbon composition weight, have carbon numbers from C10 to C30.

3. The diesel fuel according to claim 1, wherein more than 60 wt % of the beta carbons of said isoparaffins are substituted with at least one alkyl substituent.

4. The diesel fuel according to claim 1, wherein more than 90 wt-% of said alkyl substituents are selected from methyl and ethyl substituents.

5. The diesel fuel according to claim 1, wherein more than 95 wt-% of the beta carbons of said isoparaffins are substituted with at least one alkyl, and/or with at least one methyl substituent.

6. The diesel fuel according to claim 1, wherein a ratio of wt-% amount of the monobranched isoparaffins to a total wt-% amount of the isoparaffins is from 0.3 to 0.9.

7. The diesel fuel according to claim 1, wherein more than 84 wt-% of the dibranched, tribranched and multibranched isoparaffins are each substituted with at least two methyl substituents in positions selected from beta carbons, (ω−1) carbons or combinations thereof.

8. The diesel fuel according to claim 1, wherein a cloud point of said composition is from −25 to −40° C. when measured according to ASTM D 5771-2017.

9. The diesel fuel according to claim 1, wherein a cetane number of said composition is from 74 to 84 when measured according to EN 15195-2014.

10. The diesel fuel according to claim 1, wherein a density at 15° C. of said composition is within a range of 770-790 kg/m³ measured according to EN ISO 12185.

11. The diesel fuel according to claim 1, wherein the composition has a boiling point in a range of 170° C. to 360° C. measured according to EN ISO 3405.

12. The diesel fuel according to claim 1, wherein a total aromatic hydrocarbon content of the composition is less than 1500 wt-ppm with regard to the total hydrocarbon composition weight.

13. A renewable hydrocarbon composition comprising:
monobranched isoparaffins from 30 wt % to 50 wt % of a total hydrocarbon composition weight, each monobranched isoparaffin containing exactly one alkyl substituent;
a sum of di- and tribranched isoparaffins from 40 wt % to 60 wt % of the total hydrocarbon composition weight, each dibranched isoparaffin containing exactly two alkyl substituents and each tribranched isoparaffin containing exactly three alkyl substituents;
from 5 wt % to 15 wt % of a sum of multibranched isoparaffins, each multibranched isoparaffin containing more than three alkyl substituents; and
from 2 wt % to 20 wt % of n-paraffins,
wherein said isoparaffins and n-paraffins have carbon numbers from C8 to C30, and of said isoparaffins and n-paraffins from 85 to 98 wt % have carbon numbers from C15 to C30;
wherein more than 60 wt % of beta carbons of said isoparaffins are substituted with at least one alkyl substituent.

14. The composition according to claim 13, wherein of said isoparaffins and n-paraffins, at least 90 wt-% by the total hydrocarbon composition weight, have carbon numbers from C10 to C30.

15. The composition according to claim 13, wherein more than 70 wt % of the beta carbons of said isoparaffins are substituted with at least one alkyl substituent.

16. The composition according to claim 13, wherein more than 90 wt-% of said alkyl substituents are selected from methyl and ethyl substituents.

17. The composition according to claim 13, wherein more than 95 wt-% of the beta carbons of said isoparaffins are substituted with at least one alkyl substituent.

18. The composition according to claim 13, wherein a ratio of wt-% amount of the monobranched isoparaffins to a total wt-% amount of the isoparaffins is from 0.3 to 0.9.

19. The composition according to claim 13, wherein more than 84 wt-% of the dibranched, tribranched and multi-branched isoparaffins are each substituted with at least two methyl substituents in positions selected from beta carbons, ($\omega$−1) carbons or combinations thereof.

20. The composition according to claim 13, wherein a cloud point of said composition is from −25 to −40° C. when measured according to ASTM D 5771-2017.

21. The composition according to claim 13 wherein a cetane number of said composition is from 74 to 84 when measured according to EN 15195-2014.

22. The composition according to claim 13, having a density at 15° C. of 770-790 kg/m³ measured according to EN ISO 12185.

23. The composition according to claim 13, wherein the composition has a boiling point in a range of 170° C. to 360° C. measured according to EN ISO 3405.

24. The composition according to claim 13, wherein a total aromatic hydrocarbon content of the composition is less than 1500 wt-ppm with regard to the total hydrocarbon composition weight.

* * * * *